July 23, 1946. W. D. SCHMIDT 2,404,750
GAUGE
Filed Aug. 28, 1944

Inventor
William D. Schmidt.
By Chas. H. Richards
Attorney

Patented July 23, 1946

2,404,750

UNITED STATES PATENT OFFICE 2,404,750

GAUGE

William D. Schmidt, Worcester, Mass.

Application August 28, 1944, Serial No. 551,459

7 Claims. (Cl. 33—147)

It is an object of the present invention to provide means for measuring objects having close tolerances.

It is a further object of the present invention to provide a simple measuring device that is self contained for accurately measuring variations between successive workpieces.

It is a further object of the present invention to provide a portable measuring device for substantially unskilled operators to measure workpieces to very close tolerances.

Further objects will appear in the detailed description in conjunction with the accompanying drawing, in which.

Figure 1:
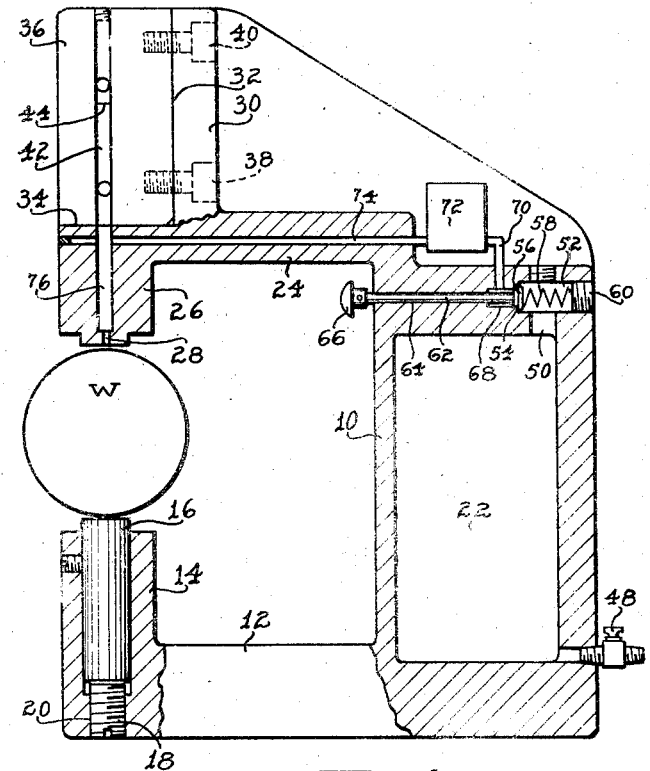
Fig. 1 is a side elevation partially in section showing the construction of the device.

Referring to Fig. 1 it will be noted that the device comprises a body 10 having a lower arm 12 from which rises a portion 14. Within the portion 14 a cylindrical member or anvil 16 is slidably mounted, said member having a threaded portion 18 which is screw threaded into a threaded hole 20 in the portion 14.

The body 10 also has a chamber 22 and an upper arm 24 from which depends a portion 26 in which there is an orifice 28. Extending upward from the arm 24 is a portion 30 which provides a bearing surface 32. A bearing surface 34 is also finished on the upper arm 24.

A transparent member 36, mounted on the surfaces 32 and 34, is fastened in place by means of screws 38 and 40. This transparent member can be made of a moldable plastic material in which is cast a curved tube 42 in which is a fluid 44 thereby forming a manometer; the indicia 46 for indicating the variations in the height of the fluid being marked on the surface of the member 36.

A valve 48 is screw threaded into the body 10 to provide means by which compressed gas (for example, air) may be introduced into the chamber 22 from any available source. The body 10 is provided with intersecting passages 50 and 52, the latter passage providing a valve seat 54 for a valve 56. A spring 58 maintains the valve 56 against the seat 54 and a screw plug 60 has the dual duty of providing the proper spring pressure and closing the passage 52.

The valve 56 has a stem 62 which extends through a bearing passage 64 in the body 10, said stem having a cap 66 fastened on the end. Beyond the valve seat 54 is a reduced passage 68 which is intercepted by a conduit 70 that leads to a pressure regulating valve 72. The pressure regulating valve can be any one of several common types of valves that are available commercially and need not be described other than to say it regulates the pressure of the gas from the chamber 22 to the orifice 28.

A conduit 74 connects the regulating valve 72 with a passage 76 one end of which is intercepted by the orifice 28 and the other end connects with the manometer tube 42 in the transparent block 36.

The anvil 16 is adjusted relative to the orifice 28 to a dimension suitable for the passage of a workpiece W of the desired size. When the workpiece is in position the operator presses the cap 66 which opens the valve 54 thereby allowing the compressed gas in the chamber 22 to flow through the regulating valve 72 to the orifice 28 and the manometer tube 42 by the way of conduit 74 and passage 76.

Variations in successive workpieces are measured on the indicia 46 by the amount of movement of the fluid 44 in the manometer tube and this movement is governed by the flow of the gas through the orifice 28 as restricted by the workpiece. Workpieces that are undersize allowing the gas to escape comparatively freely with a small amount of movement of the fluid 44 while a workpiece that is up to size will restrict the flow of gas with the consequent large movement of the fluid 44.

Figure 4:
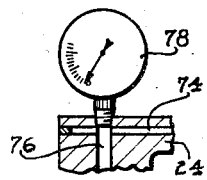
Fig. 4 shows a modification in the device.
Figure 3:
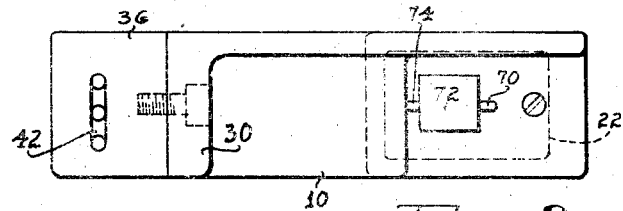
Fig. 3 is a plan view of the device.
Figure 2:
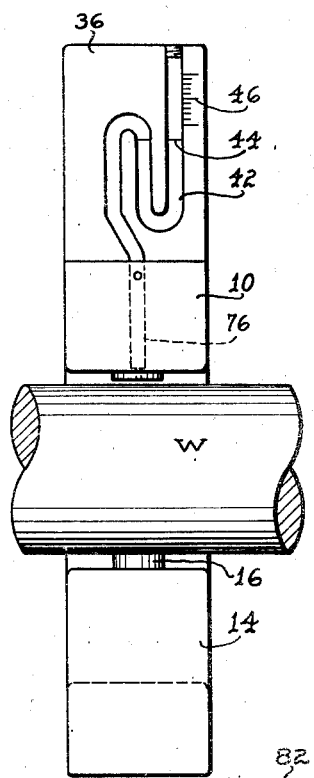
Fig. 2 is a front elevation of the device.

Fig. 4 shows a dial indicator gauge 78 which may be used instead of a manometer for registering variations in the escape of gas due to the restriction of the orifice 28 by the work W.

This invention is applicable to both external and internal gauging and has so been considered.

From the above description it will be seen that I have provided a self-contained measuring device which is simple in construction, easy to operate and readily moved from place to place as required.

Figure 5:
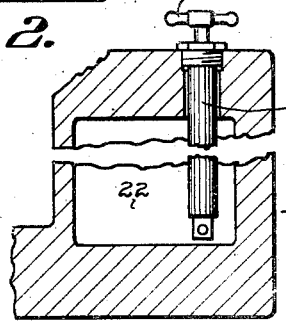
Fig. 5 shows a modification of the device wherein it is entirely self-contained.

Fig. 5 is a modification in the construction of the device shown in Fig. 1, wherein air is compressed by means of a hand operated air pump 80 which is operated manually by means of a handle 82. The construction of the air pump is old and well known in the art and as the said construction forms no part of this invention, the pump need not be further described other than to say that it introduces and compresses air in the chamber 22.

With this construction I have provided a simple gauge device having extreme accuracy that can be used anywhere without the necessity of being near a source of supply of compressed gas in order to refill the chamber 22.

Having thus fully described my invention, what I claim new and desire to secure by Letters Patent, is:

1. A device for measuring a workpiece comprising a body member having means to support a workpiece, a chamber for compressed gas formed in said body member, an orifice connected to said chamber, means to indicate variations in the pressure of said gas flowing through said orifice, and means operable to introduce gas in said chamber to said orifice and said indicating means.

2. A device for measuring a workpiece comprising a body member having means to support a workpiece, a chamber formed in said body member for compressed gas, an orifice spaced from the work supporting means and connected to said chamber, means to indicate variations in the pressure of gas flowing through said orifice as restricted by a workpiece placed between the work-supporting means and the orifice, a valve operable to introduce gas from said chamber to the orifice and indicating means and means for introducing and compressing gas in said chamber.

3. A device for measuring a workpiece comprising a body member having adjustable means to support a workpiece, a chamber formed in said body member for compressed gas, an orifice spaced from the work supporting means and connected to said chamber, a transparent indicator having a manometer cast therein connected to said chamber, fluid in said manometer, indicia on said indicator, and a manually actuated valve to allow gas to flow from said chamber to said orifice and manometer whereby variations in the escape of gas from said orifice is indicated by the indicia due to the displacement of the fluid in the manometer and means for introducing and compressing gas in said chamber.

4. A device for measuring workpieces comprising a unitary body member having a chamber formed therein for compressed gas, an orifice, an adjustable work support, a regulating valve between said chamber and said orifice, and a manually actuated valve connecting said chamber to said regulating valve.

5. A device for measuring workpiece comprising a unitary body member having a chamber formed therein for compressed gas, an orifice, a work support, a manometer, a regulating valve between said chamber and said orifice and manometer, manually actuated valve means to allow the gas in the chamber to flow to said regulating valve, and manually operable means to introduce and compress gas in said chambers.

6. A device for measuring a workpiece comprising a body member having means to support a workpiece, a chamber formed in said body for compressed gas, an orifice connected to said chamber, means to indicate variations in the pressure of said gas flowing through said orifice, valve means operable to allow the gas in said chamber to flow to said orifice and said indicating means, and manually operable means to introduce and compress gas in said chamber.

7. A device for measuring workpiece comprising a unitary body member having a chamber formed therein for compressed gas, an adjustable work support, manually operable means to introduce and compress gas in said chamber, an orifice opposite the work supporting means connected to said chamber, means to indicate variations in the pressure of said gas flowing through said orifice, valve means manually operable to allow the gas in said chamber to flow to said orifice and indicating means, and a regulating valve to regulate the quantity of compressed gas flowing to said orifice and indicating means when said valve means is actuated.

WILLIAM D. SCHMIDT.